United States Patent [19]
Thatcher et al.

[11] Patent Number: 6,085,289
[45] Date of Patent: Jul. 4, 2000

[54] METHOD AND SYSTEM FOR LOAD DATA FORMATTING AND IMPROVED METHOD FOR CACHE LINE ORGANIZATION

[75] Inventors: Larry Edward Thatcher; John Beck, both of Austin; Michael Kevin Ciraula, Round Rock, all of Tex.

[73] Assignee: International Business Machines Corporation, Armonk, N.Y.

[21] Appl. No.: 08/896,475

[22] Filed: Jul. 18, 1997

[51] Int. Cl.⁷ ..................................................... G06F 12/00
[52] U.S. Cl. ........................... 711/118; 711/138; 711/201; 712/300
[58] Field of Search ..................................... 711/118, 138, 711/201; 708/204, 205; 712/204, 300

[56] References Cited

U.S. PATENT DOCUMENTS

| | | | |
|---|---|---|---|
| 3,842,399 | 10/1974 | Kneuer et al. | 370/545 |
| 4,961,162 | 10/1990 | Nguyenphu et al. | 708/510 |
| 5,363,098 | 11/1994 | Antoshenkov | 341/95 |
| 5,499,204 | 3/1996 | Barrera et al. | 711/100 |
| 5,550,972 | 8/1996 | Patrick et al. | 345/507 |
| 5,557,763 | 9/1996 | Senter et al. | 712/23 |
| 5,577,200 | 11/1996 | Abramson et al. | 709/100 |
| 5,668,984 | 9/1997 | Taborn et al. | 708/205 |
| 5,691,920 | 11/1997 | Levine et al. | 702/186 |
| 5,721,957 | 2/1998 | Huang et al. | 710/66 |

*Primary Examiner*—Glenn Gossage
*Attorney, Agent, or Firm*—Sawyer Law Group LLP; Anthony V.S. England

[57] ABSTRACT

An improved load data formatter and methods for improving load data formatting and for cache line data organization are disclosed. The load data formatter includes a data selection mechanism, the data selection mechanism receiving a data cache line of a predetermined organization, and the data selection mechanism further supporting adjacent word swapping in the cache line. The load data formatter further includes at least two word selectors coupled to an output of the data selection mechanism, the at least two word selectors forming a doubleword on a chosen word boundary of the cache line. In a further aspect, the predetermined organization of the cache line is provided by grouping each corresponding bit of each byte in a cache line of data together, and expanding the grouping with an organization formed by one bit from a same byte within each word. The at least two word selectors may comprise even and odd multiplexers, and the load data formatter may also include splice registers, coupled to an output of one of the at least two selectors, which provide formatting of unaligned load access across a cache line boundary.

28 Claims, 5 Drawing Sheets

Bit Organization

| 1 Bit from Bytes | Words | | | | | | | | |
|---|---|---|---|---|---|---|---|---|---|
| | 0 | 1 | 2 | 3 | 4 | 5 | 6 | 7 | |
| | 0 | 4 | 8 | 12 | 16 | 20 | 24 | 28 | Group 1 (8 bits) |
| | 1 | 5 | 9 | 13 | 17 | 21 | 25 | 29 | 2 |
| | 2 | 6 | 10 | 14 | 18 | 22 | 26 | 30 | 3 |
| | 3 | 7 | 11 | 15 | 19 | 23 | 27 | 31 | 4 |

Physical Cacheline Organization
by Bit  0s  1s  2s  3s  4s  5s  6s  7s

By Bit Expansion

From Bytes  0  4  8  12  16  20  24  28  1  5  9  13  17  21  25  29

2  6  10  14  18  22  26  30  3  7  11  15  19  23  27  31

| Load Adr (BE) | Output (Bytes) | | | | | | | | |
|---|---|---|---|---|---|---|---|---|---|
| | Even Wd Mux | | | | Odd Wd Mux | | | | |
| 0 | 0 | 1 | 2 | 3 | 4 | 5 | 6 | 7 | |
| 4 | 8 | 9 | 10 | 11 | 4 | 5 | 6 | 7 | Reversed |
| 8 | 8 | 9 | 10 | 11 | 12 | 13 | 14 | 15 | |
| C | 16 | 17 | 18 | 19 | 12 | 13 | 14 | 15 | Reversed |
| 10 | 16 | 17 | 18 | 19 | 20 | 21 | 22 | 23 | |
| 14 | 24 | 25 | 26 | 27 | 20 | 21 | 22 | 23 | Reversed |
| 18 | 24 | 25 | 26 | 27 | 28 | 29 | 30 | 31 | |
| 1C | x | x | x | x | 28 | 29 | 30 | 31 | Reversed (Splice Case) |

| Load Adr (BE) | Output (Bytes) | | | | | | | |
|---|---|---|---|---|---|---|---|---|
| | Even Wd Mux | | | | Odd Wd Mux | | | |
| 0 | 0 | 1 | 2 | 3 | 4 | 5 | 6 | 7 |
| 4 | 4 | 5 | 6 | 7 | 8 | 9 | 10 | 11 |
| 8 | 8 | 9 | 10 | 11 | 12 | 13 | 14 | 15 |
| C | 12 | 13 | 14 | 15 | 16 | 17 | 18 | 19 |
| 10 | 16 | 17 | 18 | 19 | 20 | 21 | 22 | 23 |
| 14 | 20 | 21 | 22 | 23 | 24 | 25 | 26 | 27 |
| 18 | 24 | 25 | 26 | 27 | 28 | 29 | 30 | 31 |
| 1C | 28 | 29 | 30 | 31 | x | x | x | x | (Splice Case)

FIG. 4B

| Load Adr (LE) | Output (Bytes) | | | | | | | | |
|---|---|---|---|---|---|---|---|---|---|
| | Even Wd Mux | | | | Odd Wd Mux | | | | |
| 0 | 0 | 1 | 2 | 3 | 4 | 5 | 6 | 7 | |
| 4 | 0 | 1 | 2 | 3 | 12 | 13 | 14 | 15 | Reversed |
| 8 | 8 | 9 | 10 | 11 | 12 | 13 | 14 | 15 | |
| C | 8 | 9 | 10 | 11 | 20 | 21 | 22 | 23 | Reversed |
| 10 | 16 | 17 | 18 | 19 | 20 | 21 | 22 | 23 | |
| 14 | 16 | 17 | 18 | 19 | 28 | 29 | 30 | 31 | Reversed |
| 18 | 24 | 25 | 26 | 27 | 28 | 29 | 30 | 31 | |
| 1C | 24 | 25 | 26 | 27 | x | x | x | x | Reversed (Splice Case) |

FIG. 5A

| Load Adr (LE) | Output (Bytes) | | | | | | | |
|---|---|---|---|---|---|---|---|---|
| | Even Wd Mux | | | | Odd Wd Mux | | | |
| 0 | 0 | 1 | 2 | 3 | 4 | 5 | 6 | 7 |
| 4 | 12 | 13 | 14 | 15 | 0 | 1 | 2 | 3 |
| 8 | 8 | 9 | 10 | 11 | 12 | 13 | 14 | 15 |
| C | 20 | 21 | 22 | 23 | 8 | 9 | 10 | 11 |
| 10 | 16 | 17 | 18 | 19 | 20 | 21 | 22 | 23 |
| 14 | 28 | 29 | 30 | 31 | 16 | 17 | 18 | 19 |
| 18 | 24 | 25 | 26 | 27 | 28 | 29 | 30 | 31 |
| 1C | x | x | x | x | 24 | 25 | 26 | 27 | (Splice Case)

Case I  Load Word (Bytes 1-4)

|     | Unaligned Doubleword | | Aligned Doubleword | |
|-----|------|------|------|------|
| Adr | BE   | LE   | BE   | LE   |
| 0   | 1234 —— | —— 1234 | 1234 —— | —— 1234 |
| 1   | -1234 — | — 1234- | -1234 — | — 1234- |
| 2   | — 1234 — | — 1234 — | — 1234 — | — 1234 — |
| 3   | — -1234 | -1234 — | — -1234 | -1234 — |
| 4   | —— 1234 | 1234 —— | —— 1234 | 1234 —— |
| 5   | 4 — 123 | 234 — 1 | -1234 — | — 1234- |
| 6   | 34 — 12 | 34 — 12 | — 1234 — | — 1234 — |
| 7   | 234 — 1 | 4 — 123 | — -1234 | -1234 — |

Repeating Pattern (aligned section, rows 5–7 → rows 0–2)

Case II  Load Word (Bytes 1-4)  Byte Reversed

|     | Unaligned Doubleword | | Aligned Doubleword | |
|-----|------|------|------|------|
| Adr | BE   | LE   | BE   | LE   |
| 0   | 4321 —— | —— 4321 | 4321 —— | —— 4321 |
| 1   | -4321 — | — 4321- | -4321 — | — 4321- |
| 2   | — 4321 — | — 4321 — | — 4321 — | — 4321 — |
| 3   | — -4321 | -4321 — | — -4321 | -4321 — |
| 4   | —— 4321 | 4321 —— | —— 4321 | 4321 —— |
| 5   | 1 — 432 | 321 — 4 | -4321 — | — 4321- |
| 6   | 21 — 43 | 21 — 43 | — 4321 — | — 4321 — |
| 7   | 321 — 4 | 1 — 432 | — -4321 | -4321 — |

Repeating Pattern

METHOD AND SYSTEM FOR LOAD DATA FORMATTING AND IMPROVED METHOD FOR CACHE LINE ORGANIZATION

FIELD OF THE INVENTION

The present invention relates generally to load data formatting, and more particularly to load data formatting for unaligned and aligned data accesses.

BACKGROUND OF THE INVENTION

Advances in computer system performance depend on many factors. Further, today's microprocessors are targeted for many different operating environments. An important area for improving system operation in various environments is the improvement of memory data processing. More particularly, operations associated with a load/store engine of a microprocessor are influential in maintaining optimal data processing.

Typically, load instructions performed by a load/store engine of a microprocessor require formatting of the data to be loaded. A load formatter is therefore usually provided at the output of the data cache to perform the data formatting. Improvements in the formatting of load data remain a vital aspect of improving data processing and overall system performance.

In the area of load data formatting, a needed improvement is support for aligned and unaligned data accesses. Further, providing support for Big Endian and Little Endian addressing modes is preferable, as well as providing support for fixed point functions that load words, halfwords, bytes, byte reverses, and sign extends. Similarly, supporting floating point functions including those that load words and doublewords is desirable. Another sought feature is providing load formatting support for input/output (I/O) data formatting. While it is key that the load data formatting in the microprocessor be able to support these features to achieve better system performance, preferably, such improvement occurs with no added performance penalty.

Accordingly, what is needed is a load formatter that provides these preferred functionalities in an efficient manner.

SUMMARY OF THE INVENTION

The present invention provides an improved load data formatter and method for providing same. A load data formatter includes a data selection mechanism, the data selection mechanism receiving a data cache line of a predetermined organization, and the data selection mechanism further supporting adjacent word swapping in the cache line. The load data formatter further includes at least two word selectors coupled to an output of the data selection mechanism, the at least two word selectors forming a doubleword on a chosen word boundary of the cache line. In a further aspect, the predetermined organization of the cache line is provided by grouping each corresponding bit of each byte in a cache line of data together, and expanding the grouping with an organization formed by one bit from a same byte within each word.

With the present invention, improved load data formatting occurs efficiently with reduced wiring and wire delays. Further, adjacent word swapping provides efficient accesses on any word boundary within the selected cache line. In addition, the load formatter supports a wide range of fixed load and floating point load instructions, single cycle access in a cache line boundary for Big and Little Endian addressing modes, as well as formatting of unaligned load accessing across a cache line boundary in two cycles. An advantageous cache line organization facilitates the operations of the load formatter. These and other advantages of the aspects of the present invention will be more fully understood in conjunction with the following detailed description and accompanying drawings.

BRIEF DESCRIPTION OF THE DRAWINGS

FIG. 3 illustrates a representation of a preferred cache organization in accordance with the present invention.

FIGS. 4a and 4b illustrate outputs of even and odd selectors of the load formatter of FIG. 2 in a Big Endian addressing mode.

FIGS. 5a and 5b illustrate outputs of even and odd selectors of the load formatter of FIG. 2 in a Little Endian addressing mode.

FIG. 6 illustrates inputs for byte selection devices for aligned and unaligned doublewords on a load word function.

DESCRIPTION OF THE INVENTION

The present invention relates to load data formatting. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
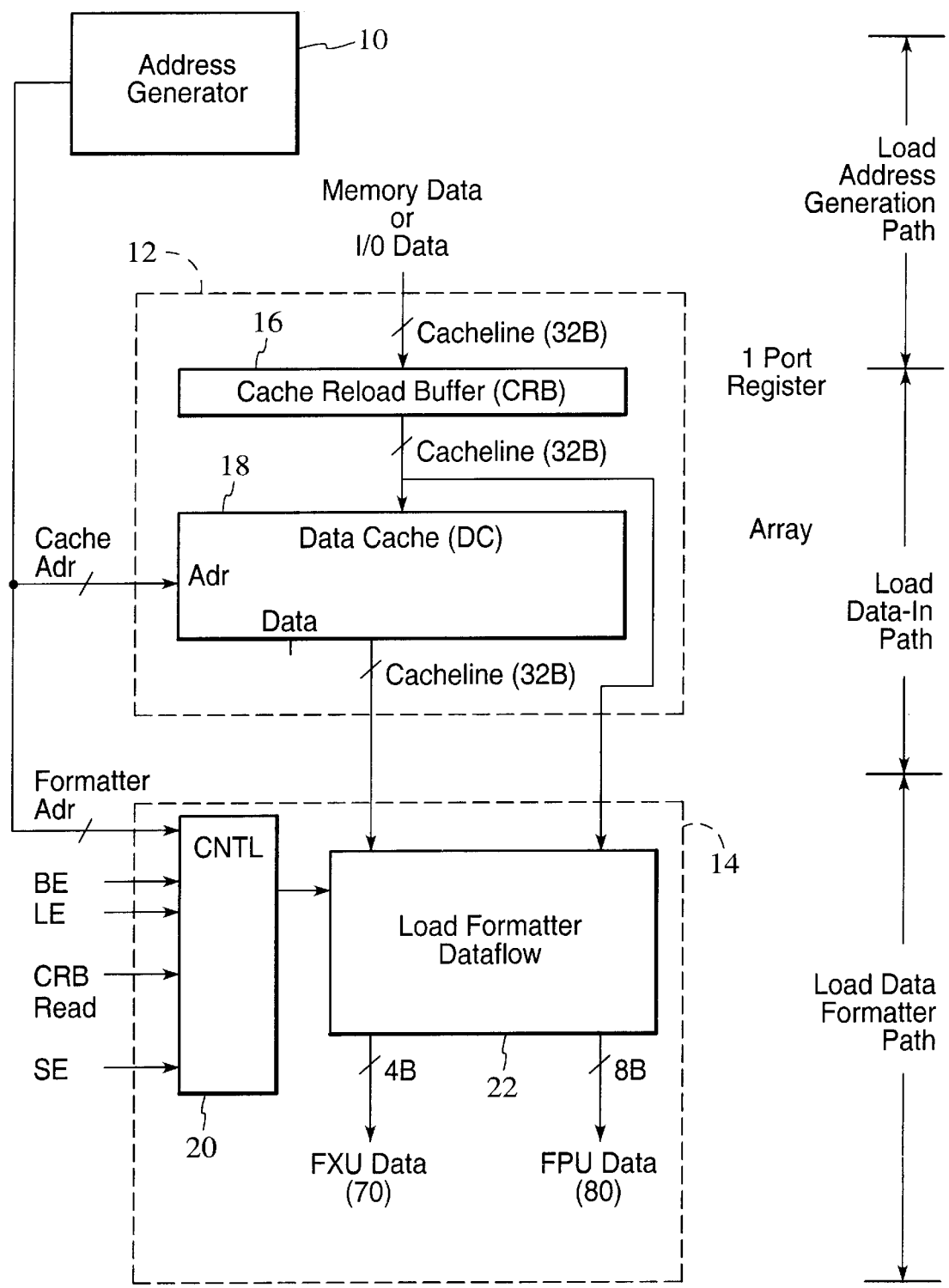
FIG. 1 illustrates a block diagram of a load data path in accordance with the present invention.

FIG. 1 illustrates a load data path in a microprocessor, such as a PowerPC™ processor available from International Business Machines (IBM) Corporation, Inc. A discussion of the aspects of a PowerPC™ microprocessor may be found in U.S. Pat. No. 5,691,920 entitled "Method and System for Performance Monitoring of Dispatch Unit Efficiency in Processing System," and assigned to the assignee of the present invention. The load data path, as shown in FIG. 1, suitably includes an address generator 10, a data input mechanism 12, and a data formatter 14. The data input mechanism 12 suitably includes a cache reload buffer (CRB) 16 and a data cache (DC) 18. The data formatter 14 preferably includes a control mechanism 20 and a load formatter 22. Load formatter 22 is further detailed hereinbelow with reference to FIG. 2.

In the load data path of FIG. 1, the address generator 10 generates an address which is used to select a cache line from data cache 18, as is well understood to those skilled in the art. The portion of the address which indexes into a cache line, e.g., a formatter address signal, is suitably provided to control mechanism 20 of the data formatter 14. The cache reload buffer 16 of data input mechanism 12 suitably loads memory data or I/O data from the memory hierarchy, as is well understood by those skilled in the art. The data, i.e., cache line, from cache reload buffer 16 is preferably loaded into data cache 18 or bypassed to the data formatter 14. The provision of the bypass path to data formatter 14 allows for critical data forwarding on a cache reload or I/O data forwarding without loading the data cache 18 on a load from I/O space.

Selection of appropriate data from data cache 18 or cache reload buffer 16 suitably occurs in the load formatter 22 in conjunction with control mechanism 20. The control mechanism 20 preferably provides control signals to load formatter 22 based on the formatter address signal, Big Endian (BE) and Little Endian (LE) mode signals, a cache reload buffer read (CRB Read) signal, and a sign extend (SE) signal, as is well understood by those skilled in the art. The load formatter 22 utilizes the control signals to select referenced load data from the selected cache line input, as described with reference to FIG. 2.

Figure 2:
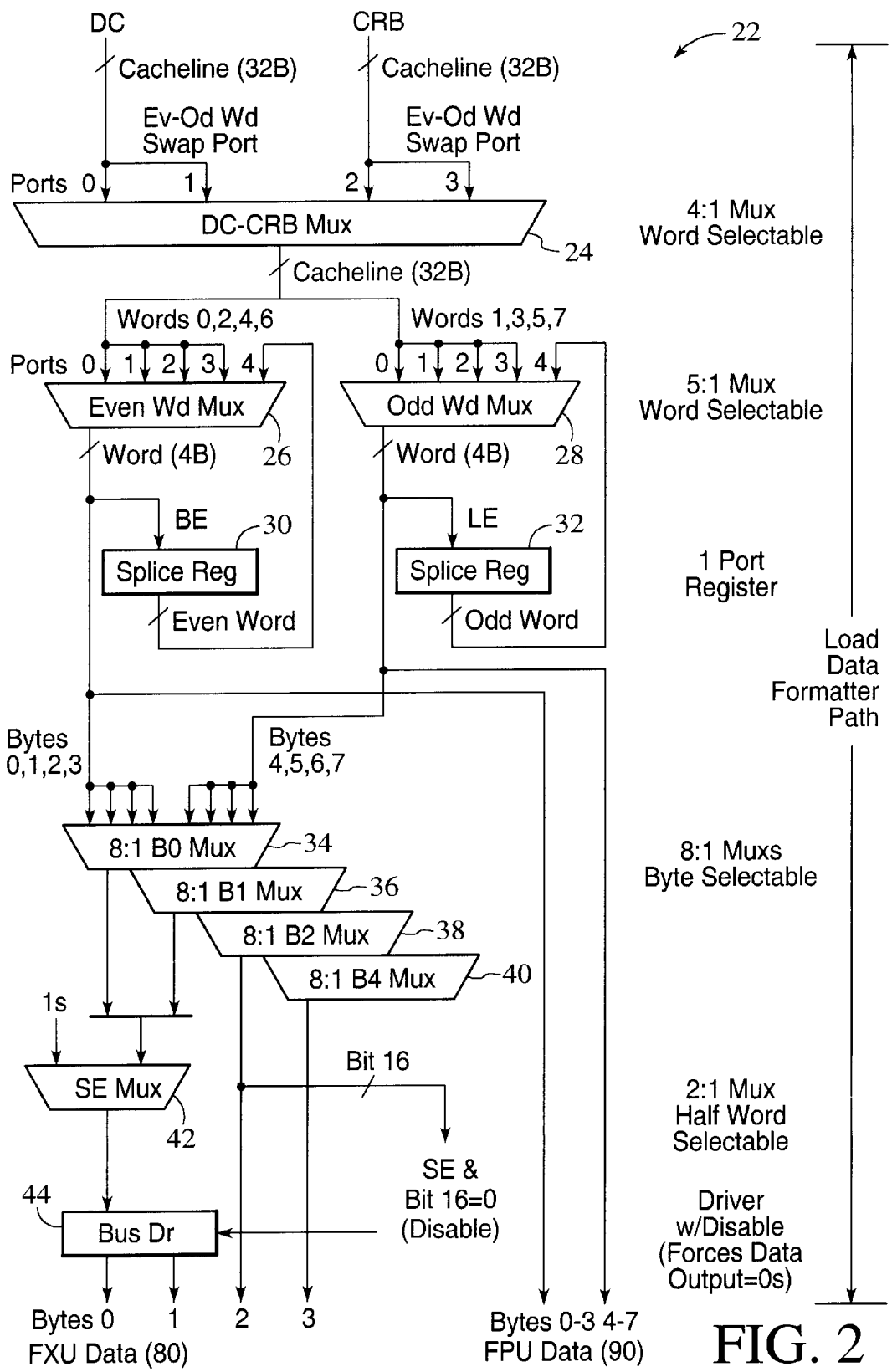
FIG. 2 illustrates the load formatter of FIG. 1 in greater detail.
Figures 3, 4A:
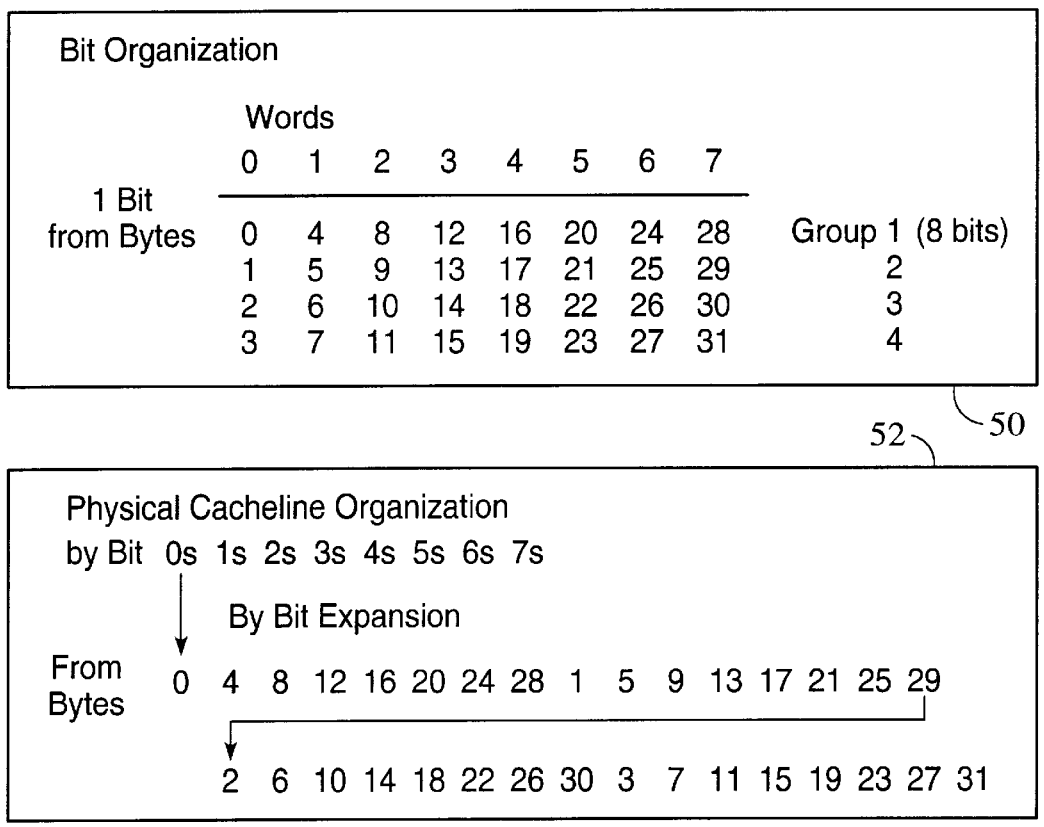

As shown in FIG. 2, the load formatter 22 suitably includes a data selection device 24, e.g., a 4:1 multiplexor (MUX), to select a cache line from either data cache 18 or cache reload buffer 16. Suitably, the data flow of the selected cache line through load formatter 22 reflects a preferred organization of the cache line. FIG. 3 illustrates a cache line organization in accordance with the present invention. It should be appreciated that although the following is described in terms of word length groups within a 32-byte (32B) cache line associated with a 32-bit microprocessor system, the principles are equally applicable for cache lines of any size and other cache line/microprocessor implementations, e.g., a 64-bit microprocessor would require a doubleword length and all components in the data formatter would need to be doubled.

For a 32 byte cache line, suitably the cache line data is organized by bits, such that all the bit 0s of each byte are grouped together, followed by all the bit 1s, then all the bit 2s, 3s, 4s, Ss, 6s, and 7s. The bit organization is then suitably expanded to group all of the bit 0s from the first bytes of each of the eight words together. Following that are all of the bit 0s from the second bytes of the eight words are grouped, then all the bit 0s from the third bytes, and then all of the bit 0s from the fourth bytes. Then, all the bit is are regrouped similarly, followed by all of the bit 2s, and so on through the bit 7s of each of the eight words. Chart 50 of FIG. 3 illustrates the correspondence between the four bytes of each of the eight words and the order with which one bit from each byte of each word produces the bit organization in the cache line. By way of example, box 52 illustrates the order of the organized bit 0s in the cache line, where the physical organization of the cache line is by bit 0s 1s 2s 3s 4s 5s 6s and 7s. With the cache line data organized in accordance with the present invention, reduced wiring and wire delays in the load data formatter are suitably facilitated, as is discussed more fully with reference to the flow of data in the load formatter 22 of FIG. 2.

Referring to FIG. 2, preferably then data selection device 24 is 4 ported. For example, ports 0 and 2 provide straight forward muxing of data from either the cache reload buffer 16 or data cache 18. Ports 1 and 3 of data selection device 24, when selected, suitably reverse the order of the words in the cache line, such that all adjacent even words and odd words may be swapped. Thus, the cache line organization logically changes from words in the order of 01234567 to 10325476 through swapping. As seen from FIG. 3, through the organization of the cache line, the reversal of word order requires only adjacent bits to swap and thus only minimal wiring and wire delays.

Data selection device 24 suitably feeds the selected data into even word multiplexor (mux) or selector 26 and odd word multiplexor (mux) or selector 28, e.g., 5:1 MUXes. Even and odd word multiplexor (mux) or selectors 26 and 28, working in conjunction, suitably form a doubleword in "Big Endian" (BE) or "Little Endian" (LE) mode on any word boundary. Preferably, a swap function in selection device 24 facilitates the forming of a doubleword on an odd word boundary in accordance with the present invention. The doubleword formed via the even and odd selectors 26 and 28 for situations occurring without and with the swap function are suitably represented in FIGS. 4a, 4b, 5a, and 5b; FIG. 4a illustrates BE mode output without a swap in the selection device 24, FIG. 4b illustrates BE mode output with the swap function, FIG. 5a illustrates LE mode output without a swap in the selection device 24, and FIG. 5b illustrates LE mode output with the swap function.

As shown in FIGS. 4a and 5a, the output of data selection device 24 without the swap is eight words in the order 0:7. Whenever the load address accesses an even word boundary, the doubleword accessed is left justified. On an odd word boundary load access, the doubleword is reversed. In these circumstances, the doubleword in unaligned.

With the swap function of the present invention, as shown in FIGS. 4b and 5b, the output of the data selection device 24 for even word load accesses remains words 0:7. On odd word load accesses, however, the swap function is utilized. The output of selection device 24 becomes words 10325476, thus swapping the input to the even and odd selectors 26 and 28, so that odd words can be selected by the even selector 26 and even words can be selected by odd selector 28. With the swap function, all load address accesses return a doubleword that is left justified and aligned. Suitably, the control of the swap function in selection device 24 is the doubleword address bit, while the control of even selector 26 and odd selector 28 is based on the word address in the cache line and BE and LE modes.

The outputs of the even and odd selectors 26 and 28 successfully drive FPU (floating point unit) data. Here unaligned data accesses are suitably only supported on a word boundary. As shown in FIG. 2, FPU word accesses are contained in bytes 0–3 of the FPU data, while FPU doubleword accesses are contained in bytes 0–7.

Even and odd selectors 26 and 28 have an additional port 4 for splice functions when unaligned data accesses cross a cache line boundary. A splice register 30 is suitably utilized for unaligned BE access, with a splice register 32 suitably utilized for unaligned LE access. For unaligned loads that cross cache line boundaries, at least two accesses are required, where a first access loads a splice register 30 or 32, and a second access merges the splice register 30 or 32 with new data to form a doubleword. FIGS. 4a, 4b, 5a and 5b indicate splice data locations for BE and LE modes.

Load formatter 22 further includes byte selection devices 34, 36, 38, and 40, e.g., 8:1 MUXes. The inputs to the byte selection devices 34, 36, 38, and 40 are preferably the doubleword formed by the even and odd selectors 26 and 28. The byte selection devices 34–40 suitably perform the load word, halfword, byte, and byte reverse functions and output FXU (fixed point unit) data. Since the input to the byte selection devices 34–40 is an aligned doubleword, control of the byte selection devices 34–40 is greatly reduced.

By way of example, FIG. 6 contrasts the input to byte selection devices 34–40 for aligned and unaligned doublewords on load word functions. With the repeating pattern shown in FIG. 6 in the aligned doubleword column, reduced complexity of the load formatter control is achieved. Further, the repeating pattern allows control of merging in the splice registers 30 and 32 to not be required in the byte selection function, if the address is incremented by 4 bytes when generating the second access, as is well understood to those skilled in the art.

Referring back to FIG. 2, load formatter 22 further includes a sign extend (SE) selector 42, e.g., a 2:1 MUX, and a bus driver device 44. By way of example, the instruction 'load half algebraic' sign extends the value of the sign bit, i.e., bit 16, of the data into bytes 0 and 1. Performing the sign extend function requires the guessing of a sign extend value of 1s by selecting that input of the sign extend selector 42, which forces the output of the sign extend selector 42 to 1s. In parallel, the sign bit is examined. When the sign bit has a '0' value, the bus driver 44 is suitably disabled, which forces its output to 0s, thus correcting the SE data. The result of the instruction suitably provides the FXU data bytes 0–3.

Through the present invention, selection of a bit within a particular byte from the input cache line occurs more readily. By way of example, selection of bit 0 of byte 31 in the even selector 26 requires travelling from bit 0 byte 31 across bit 0 of bytes 0, 4, 8, 12, 16, 20, 24, 28, 1, 5, 9, 13, 17, 21, 25, 29, 2, 6, 10, 14, 18, 22, 26, 30, 3, 7, 11, 15, 19, 23, and 27 (see FIG. 3). Thus, the wire travels only across 32 bits instead of the normal 224 (e.g., 256–32).

Additionally, the byte selection devices 34–40 also feature reduced wiring and wiring delays. When selecting a bit in a particular byte from the input doubleword, the maximum distance the wire travels is only across eight bits instead of the normal 24 (e.g., 32–8). By way of example, selection of bit 0 byte 7 from doubleword 0 in the cache line requires travelling from bit 0 byte 7 position across bit 0 of bytes 0, 1, 2, 3, 4, 5, and 6 (see FIG. 3).

Thus, the present invention achieves improved load data formatting that reduces wiring and wire delays. Further, an advantageous cache line organization facilitates adjacent word swapping in order to provide efficient accesses on any word boundary within the selected cache line. In addition, the load formatter supports a wide range of fixed load and floating point load instructions, single cycle access in a cache line boundary for Big and Little Endian addressing modes, as well as formatting of unaligned load accessing across a cache line boundary in two cycles.

Although the present invention has been described in accordance with the embodiments shown, one of ordinary skill in the art will readily recognize that there could be variations to the embodiments and those variations would be within the spirit and scope of the present invention. For example, the preferred embodiment has been described in terms of a 32-bit microprocessor where a desired fixed point output is a 32-bit word. However, for a 64-bit microprocessor implementation, a fixed point output would require a 64-bit word. Accordingly, many modifications may be made by one of ordinary skill in the art without departing from the spirit and scope of the appended claims.

What is claimed is:

1. An improved load data formatter comprising:
    a data selection mechanism, the data selection mechanism receiving a data cache line of a predetermined organization and including a swap function for adjacent word swapping through adjacent bit swapping in the cache line; and
    at least two word selectors coupled to an output of the data selection mechanism, the at least two word selectors forming a doubleword on a chosen word boundary of the cache line.

2. The formatter of claim 1 wherein the data selection mechanism comprises a four-ported multiplexor.

3. The formatter of claim 1 wherein the data selection mechanism performs word swapping based on a doubleword address bit.

4. The formatter of claim 1 wherein the at least two selectors form the doubleword based on a word address and a selected addressing mode.

5. The formatter of claim 1 wherein the at least two selectors provide formatting of unaligned load accesses within a cache line boundary in a single cycle.

6. The formatter of claim 1 wherein the at least two word selectors comprise an even and odd word multiplexor.

7. The formatter of claim 6 wherein the even and odd word multiplexor further each comprise a 5:1 multiplexor.

8. The formatter of claim 1 further comprising splice registers, one splice register coupled to an output of one of the at least two selectors.

9. The formatter of claim 8 wherein the splice registers further provide formatting of unaligned load access across a cache line boundary.

10. The formatter of claim 9 wherein the unaligned load access across a cache line boundary occurs in two cycles.

11. A method for improved load data formatting comprising:
    organizing a cache line of data with a predetermined organization to allow efficient adjacent word swapping through adjacent bit swapping in the cache line; and
    forming a doubleword from the cache line on a chosen word boundary within the cache line.

12. The method of claim 11 wherein the chosen word boundary comprises an odd word boundary.

13. The method of claim 11 wherein the chosen word boundary comprises an even word boundary.

14. The method of claim 11 wherein the step of forming comprises swapping adjacent words in the cache line based on a doubleword address bit.

15. The method of claim 11 wherein the step of forming comprises performing unaligned loads in a single cycle.

16. The method of claim 11 wherein the cache line comprises 32 bytes of data.

17. The method of claim 11 wherein the organizing of a cache line of data with a predetermined organization comprises grouping each corresponding bit of each byte in a cache line of data together into grouped words, and organizing the grouped words by grouping one bit from a same byte of each grouped word.

18. A method for organizing cache line data, the method comprising:
    grouping each corresponding bit of each byte in a cache line of data together into grouped words;
    organizing the grouped words by grouping one bit from a same byte of each grouped word; and
    swapping by a load formatter adjacent bits of the organized cache line when adjacent words are swapped by the load formatter.

19. The method of claim 18 wherein the cache line comprises 32 bytes of data.

20. The method of claim 19 wherein the 32 bytes of data comprise eight words of four bytes per word.

21. The method of claim 18 wherein the step of grouping comprises grouping all the bit 0s of each byte of the cache line together.

22. The method of claim 21 wherein the step of grouping further comprises grouping all of the bit 1s of each byte after the bit 0s.

23. The method of claim 22 further comprising continuing the grouping with the bit 2s through the bit 7s of each byte to form eight grouped words.

24. The method of claim 23 wherein the step of grouping further comprises grouping the first eight bit 0s from all the byte 0s in the eight grouped words.

25. The method of claim 24 wherein the step of grouping further comprises grouping the second eight bit 0s from all the byte 1s in the eight grouped words.

26. The method of claim 25 wherein the step of grouping further comprises grouping the third eight bit 0s from all the byte 2s in the eight grouped words.

27. The method of claim 26 wherein the step of grouping further comprises grouping the fourth eight bit 0s from all the byte 3s in the eight grouped words.

28. The method of claim 27 wherein the step of grouping further comprises repeating the grouping of the bits of each byte for bit 1s through bit 7s.

* * * * *